United States Patent
Ramadan et al.

(10) Patent No.: US 11,766,643 B1
(45) Date of Patent: Sep. 26, 2023

(54) HYDROPHOBIC NOVEL BIOFILM MEMBRANE MODIFIED WITH A SPIROPOLYURETHANE

(71) Applicant: KING FAISAL UNIVERSITY, Al-Ahsa (SA)

(72) Inventors: Khaled Mohamed Amen Ramadan, Al-Ahsa (SA); Hani Saber Sayed Saudy, Al-Ahsa (SA); Sameh Ahmed Rizk, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/134,194

(22) Filed: Apr. 13, 2023

(51) Int. Cl.
| | |
|---|---|
| *B01D 61/02* | (2006.01) |
| *B01D 61/36* | (2006.01) |
| *B01D 69/02* | (2006.01) |
| *B01D 71/10* | (2006.01) |
| *B01D 71/54* | (2006.01) |
| *B01D 71/82* | (2006.01) |
| *C02F 1/44* | (2023.01) |
| *C02F 103/08* | (2006.01) |
| *B01D 67/00* | (2006.01) |
| *B01D 69/12* | (2006.01) |
| *B01D 71/56* | (2006.01) |

(52) U.S. Cl.
CPC ........... *B01D 71/82* (2013.01); *B01D 61/025* (2013.01); *B01D 61/364* (2013.01); *B01D 67/0018* (2013.01); *B01D 69/02* (2013.01); *B01D 69/1251* (2022.08); *B01D 71/10* (2013.01); *B01D 71/54* (2013.01); *B01D 71/56* (2013.01); *C02F 1/441* (2013.01); *C02F 1/447* (2013.01); *B01D 2323/36* (2013.01); *B01D 2323/39* (2013.01); *B01D 2323/46* (2013.01); *B01D 2323/56* (2022.08); *B01D 2325/026* (2013.01); *B01D 2325/02831* (2022.08); *B01D 2325/06* (2013.01); *B01D 2325/26* (2013.01); *B01D 2325/38* (2013.01); *C02F 2103/08* (2013.01)

(58) Field of Classification Search
CPC .. B01D 71/10; B01D 71/54; B01D 2325/026; B01D 2325/06; B01D 2325/38
See application file for complete search history.

(56) References Cited

U.S. PATENT DOCUMENTS

| | | | |
|---|---|---|---|
| 2011/0082247 | A1 | 4/2011 | SenGupta |
| 2014/0072653 | A1 | 3/2014 | Buschmann |

FOREIGN PATENT DOCUMENTS

| | | | |
|---|---|---|---|
| CN | 103012744 A | | 4/2013 |
| DE | 3638456 A1 | * | 5/1988 |

OTHER PUBLICATIONS

Yuan, Haoqiang, Yongqiang Zhang, and Zhenhua Xue. "Preliminary Study on a Biocompatible Cellulose Waterborne Polyurethane Composite Membrane." ACS omega 7.35 (2022): 30849-30855. (Year: 2022).*
Youssef Shatilla, "Thermal Desalination", Solar Energy Desalination Technology, 2017, Elsevier B.V., Amsterdam, The Netherlands.

* cited by examiner

*Primary Examiner* — Bradley R Spies
(74) *Attorney, Agent, or Firm* — Nath, Goldberg & Meyer; Richard C. Litman

(57) ABSTRACT

A hydrophobic biofilm membrane modified with a spiropolyurethane may be used for desalination of salt water to fresh water. The spiropolyurethane component of the membrane can produce a hydrophobic spin membrane boundary which attracts saline water, and where the hydrophobic spin membrane boundary can comprise a hinge-like motion for capture of salt molecules via a loose pore-gate spongy membrane surface texture while allowing desalinated water to flow through the porous membrane. The membrane is useful in both reverse osmosis (RO) and membrane distillation (MD) separations, including the desalination.

17 Claims, 1 Drawing Sheet

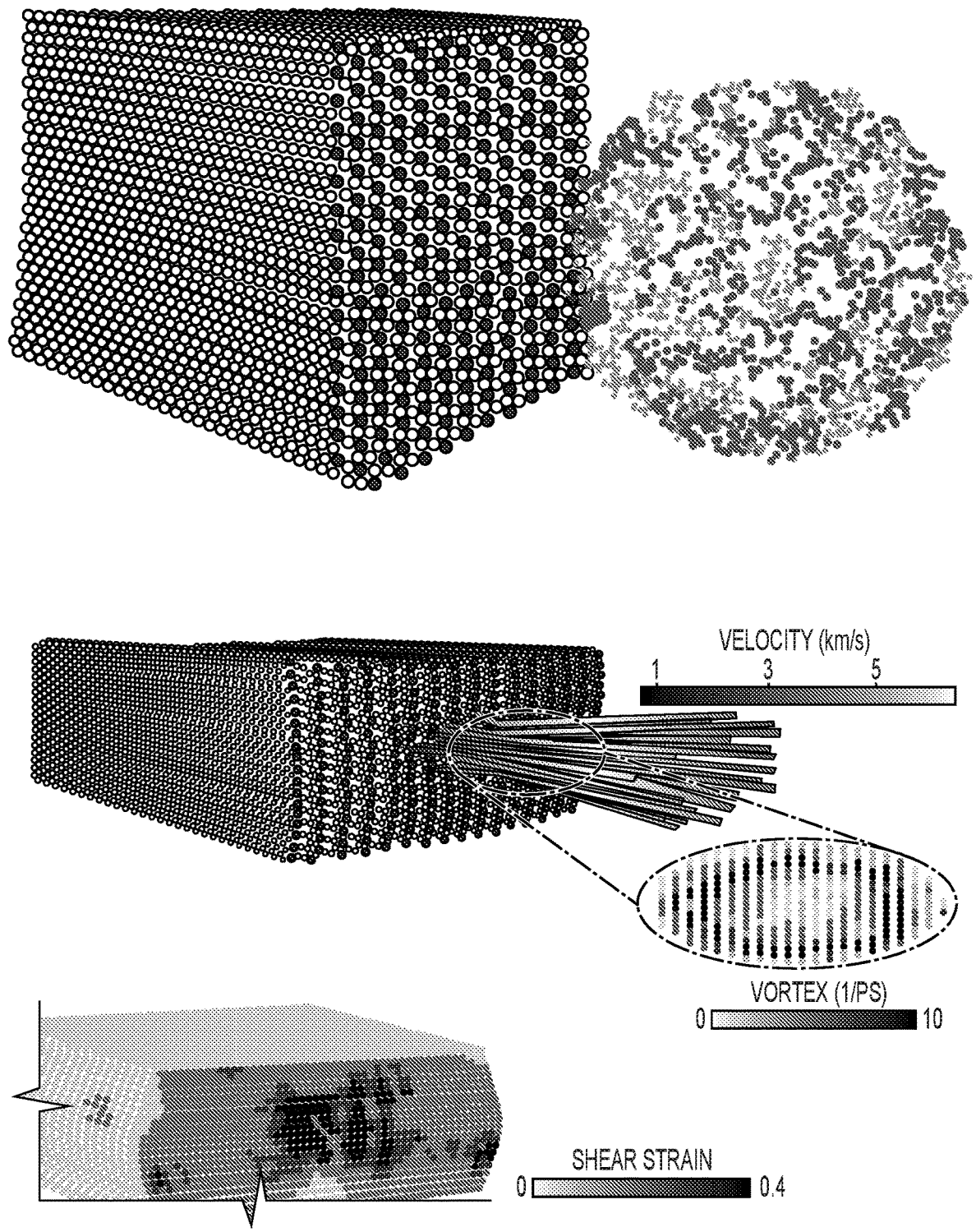

HYDROPHOBIC NOVEL BIOFILM MEMBRANE MODIFIED WITH A SPIROPOLYURETHANE

BACKGROUND

1. Field

The disclosure of the present patent application relates to a hydrophobic novel biofilm membrane modified with a spiropolyurethane for desalinating water.

2. Description of the Related Art

Water links every feature of life, but only 4% of the world's water is fresh water. As most water sources have varied salinity levels, billions of people face water scarcity, and providing enough fresh water to the world's population may be considered a global challenge. Desalination technologies that produce fresh water from solvated salt ions in saline water are garnering major attention. However, conventional desalination processes, including the current thermal and pressure processes, consume a large amount of energy.

For example, thermal desalination processes account for about half of the desalination market and consume on average an electrical energy equivalent of 10-15 kWh/m$^3$. They are, in turn, divided into the following subcategories: Multistage flash (MSF) distillation; Multi-effect distillation (MED); and Vapor compression (VC), including both thermal vapor compression (TVC), and mechanical vapor compression (MVC). Other processes include solar still distillation, humidification-dehumidification, membrane distillation, and freezing. Reverse osmosis (RO) is the most favored pressure driven process and membrane distillation (MD) is the most preferred thermally driven process.

Thus, desalination technologies that produce fresh water from saline water without consuming a large amount of energy are desired.

SUMMARY

The present subject matter relates to a hydrophobic novel biofilm membrane modified with a spiropolyurethane for desalinating water. This biofilm membrane represents a new and improved desalination technology as it includes a spongy membrane material modified with a spiropolyurethane that can effectively desalinate salt/saline water into fresh water while consuming less energy than the current technologies. The flow rate of saline water through the biofilm membrane induces an electric charge on the surface of the modified spongy membrane material that attracts most of the salt ions in the saline water onto the spongy surface and allows the flow of the desalinated water to pass through the biofilm membrane.

Accordingly, in an embodiment, the hydrophobic spongy membrane material comprises a hydrophobic spin membrane boundary. The hydrophobic spin of the spiropolyurethane spongy membrane can deliver a hinge-like motion to capture the salt molecules from the saline water via a loose pore-gate spongy membrane surface. Electrophysiological measurements indicate that the voltage-dependent spiropolyurethane activity of the spongy biofilm may depend on the hydrophobicity and presence of an aromatic ring in the hydrophobic spine. Moreover, linear free energy relationships guide the transition state structure for coupled binding and folding of the disordered spiropolyurethane part, reflecting native hydrophobic interactions suggestive of a nucleation-condensation mechanism in the modified spongy folding.

In one embodiment, the present subject matter relates to a novel hydrophobic biofilm membrane modified with a spiropolyurethane, wherein the membrane comprises a spongy porous texture and comprises lignocellulose biomass, and wherein the spiropolyurethane of the membrane produces a hydrophobic spin membrane boundary.

In another embodiment, the subject matter relates to a method of synthesizing a novel hydrophobic biofilm membrane modified with a spiropolyurethane, comprising: extracting lignocellulose biopolymer from sources selected from the group consisting of lemon grass, olive tree, date pits, rice- and wheat-straws, and combinations thereof to produce a chalcone, isatin, and/or benzoxazinone precursor; conducting a one pot reaction of the chalcone, isatin, and/or benzoxazinone precursor with glycine, thiosemicarbazide, or 2-aminouracil to produce a corresponding spiroheterocyclic product; and reacting the spiroheterocyclic product with an aromatic diisocyanate to produce the hydrophobic biofilm membrane modified with a spiropolyurethane In an embodiment, the subject matter relates to a method of desalinating saline water to fresh water comprising employing a membrane as described herein in a reverse osmosis or membrane distillation desalination process, wherein the membrane is porous, and wherein the spiropolyurethane of the membrane produces a hydrophobic spin membrane boundary which attracts the saline water.

These and other features of the present subject matter will become readily apparent upon further review of the following specification.

BRIEF DESCRIPTION OF THE DRAWINGS

FIG. 1 shows rate and flow of saline water induced electric charge on the surface of the modified spongy porous membrane.

DETAILED DESCRIPTION OF THE PREFERRED EMBODIMENTS

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not. For example, "optionally substituted alkyl" means either "alkyl" or "substituted alkyl," as defined herein.

It will be understood by those skilled in the art with respect to any chemical group containing one or more substituents that such groups are not intended to introduce any substitution or substitution patterns that are sterically impractical and/or physically non-feasible.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to an improved desalination technology using a hydrophobic novel biofilm spongy membrane material modified with a spiropolyurethane that can effectively desalinate salt water into fresh water while consuming less energy than current technologies. The rate flow of saline water induces an electric charge on the surface of the modified spongy membrane material that attracts most of the salt ions in the saline water onto the spongy surface and allows the flow of the desalinated water through the membrane. This process can be seen as outlined in FIG. 1, where the rate flow of saline water is induced by an electric charge on the surface of the modified spongy membrane which attracts most of the salts on the spongy surface and allows for the flow of the desalinated water.

In one embodiment, the spongy membrane material can include a hydrophobic spin membrane boundary. In certain embodiments, the hydrophobic spin of the spiropolyurethane spongy membrane can deliver a hinge-like motion to capture the salt molecules from the saline water via a loose pore-gate spongy membrane surface. Electrophysiological measurements indicate that the voltage-dependent spiropolyurethane activity of the spongy biofilm depends on the hydrophobicity and presence of an aromatic ring in the hydrophobic spine. Moreover, linear free energy relationships guide the transition state structure for coupled binding and folding of the disordered spiropolyurethane part, reflecting native hydrophobic interactions suggestive of the nucleation-condensation mechanism in the modified spongy folding.

In one embodiment, the subject matter relates to a novel hydrophobic biofilm membrane modified with a spiropolyurethane for desalination of water, wherein the membrane comprises a spongy porous texture and comprises lignocellulose biomass, and wherein the spiropolyurethane of the membrane produces a hydrophobic spin membrane boundary. The membrane composition is a biofilm produced from a lignocellulose biomass, such as, by way of non-limiting example, a lignocellulose biowaste, modified with a spiropolyurethane. The spiropolyurethane can form a hydrophobic spin membrane boundary. The hydrophobic spin of the spiropolyurethane spongy membrane can deliver a hinge-like motion to capture the salt molecules in the saline water via a loose pore-gate spongy membrane surface texture. The flow rate of saline water into the membrane can be induced via an electric charge on the surface of the modified spongy membrane that attracts most of the salts onto the sponge-like surface and allows for the flow of the desalinated water through the membrane, as depicted in FIG. 1. The textured membrane is represented by the square or rectangular structures in FIG. 1, and the round structure represent a salt molecule. In certain embodiments, the porous membrane can have pores sized of about 0.25-0.47 nm, making the membrane useful in a reverse osmosis (RO) desalination process at a hydraulic pressure of about 0.9-2.1 MPa.

In another embodiment, the present subject matter relates to a method of synthesizing a novel hydrophobic biofilm membrane modified with a spiropolyurethane for desalination of water. In one embodiment in this regard, the present subject matter relates to a method of synthesizing a novel hydrophobic biofilm membrane modified with a spiropolyurethane, comprising: extracting lignocellulose biopolymer from sources selected from the group consisting of lemon grass, olive tree, date pits, rice- and wheat-straws, and combinations thereof to produce a chalcone, isatin, and/or benzoxazinone precursor; conducting a one pot reaction of the chalcone, isatin, and/or benzoxazinone precursor with glycine, thiosemicarbazide, or 2-aminouracil to produce a corresponding spiroheterocyclic product; and reacting the spiroheterocyclic product with an aromatic diisocyanate to produce the hydrophobic biofilm membrane modified with a spiropolyurethane.

In an embodiment, the extraction step of the present processes can be a microwave or ultrasound-assisted extraction, which can be used to obtain the lignocellulose biopolymer from one or more sources selected from the group consisting of lemon grass, olive tree, date pits, rice- and wheat-straws, and combinations thereof. By way of non-limiting example, the source of the lignocellulose biopolymer can be rice straws, which can be extracted with ultrasound irradiation by a Sonic system (England, 50 MHz) having a horn at a power of 500 W. The ultrasound irradiation, in this step, can be conducted for up to about 30 minutes, or about 0, 5, 10, 15, 20, 25, or 30 minutes. In another embodiment, the ultrasound irradiation is carried out in an ionic liquid at about 90° C., thereby forming a mixture comprising a rice straw lignocellulose biopolymer and the ionic liquid. In some embodiments, the mixture can be continuously stirred at 90° C. for a 1 h, thereby producing a chalcone, isatin, and/or benzoxazinone precursors.

Once the mixture is obtained, a one pot reaction of the chalcone, isatin, and/or benzoxazinone precursors with glycine, thiosemicarbazide, or 2-aminouracil is conducted to obtain a corresponding spiroheterocyclic product. This spiroheterocyclic product can then react with various aromatic diisocyanates to produce a novel hydrophobic biofilm membrane modified with a spiropolyurethane as described herein. The progress of the reaction can be monitored by thin-layer chromatography (TLC) using suitable organic solvents until the starting reactants disappear.

In another embodiment, the hydrophobic biofilm membrane modified with a spiropolyurethane can be prepared using an electro spinning impregnation method, thereby producing an electrospun nanofiber membrane (ENM). Interfacial polymerization, stretching phase inversion, and/or track etching can be further used to enhance treatment strength. Electrospinning offers nanofiber control of production of the membranes with the desired properties. Such desired properties of the nanofiber membranes can be a high specific surface area, a high permeability, and a highly oriented aligned nanofiber-based construction. The interfacial polymerization can produces a polyamide coating as an ultrathin top selective layer on the electrospun nanofiber membrane (ENM) surface, resulting in thin-film nanofibrous membranes.

In another embodiment, the hydrophobic biofilm membrane modified with a spiropolyurethane can be prepared by a solvothermal method.

In an embodiment, the present subject matter relates to a method of desalinating saline water to fresh water comprising employing a membrane as described herein in a reverse osmosis or membrane distillation desalination process, wherein the membrane is porous, and wherein the spiropolyurethane of the membrane produces a hydrophobic spin membrane boundary which attracts the saline water. The membrane composition used in these methods can be a biofilm from lignocellulose biomass waste modified with a spiropolyurethane in order to produce a hydrophobic spin membrane boundary which can aid in the pairing of the hydrophobic spongy membrane and saline water. The hydrophobic spin of the spiropolyurethane spongy membrane can deliver a hinge-like motion for capture of salt molecules via the loose pore-gate spongy membrane surface texture. The flow rate of saline water can be induced via an electric charge on the surface of the modified spongy membrane that attracts most of the salts from the saline water onto the sponge-like surface and allows for the flow of the desalinated water, as depicted in FIG. 1.

In FIG. 1, the textured membrane is represented by the square or rectangular structures, and the round structure represent a salt molecule. As can be seen from FIG. 1, a round saline/salt molecule is captured by the membrane surface, while the desalinated water flows through the inner portion of the membrane at a velocity in km/s with a vortex flow rate in units of lips. The highest shear strain is in the inner center of the membrane where the flow of desalinated water is taking place.

Additionally, foams serving as a filling for two segments of a foam-salt filter can be used for their physical properties in hydrophobic structures—i.e., diameter, size distribution, porosity, and specific surface area. Hydrophobicity, water absorption, apparent density, dimensional stability, amount of adsorbed salts, and the possibility of the renewal of the membrane designated for well water desalination used in irrigation of agricultural soil lands in appropriate cost are all variables which might lead to the use of a foam for a foam-salt filter.

The membranes described herein can be used in reverse osmosis (RO) and/or membrane distillation (MD) separations. RO is the most favored pressure-driven desalination process and MD is the most preferred thermally driven desalination process. Both RO and MD methods have been efficiently used in high salt removal desalination. Textural analysis (BET) was used to measure surface parameters and diffuse reflectance spectra (DRS) to measure the absorption profile and band gap energy. The pore sizes of the novel biopolymer membrane were determined to be about 0.25-0.47 nm in conducting a reverse osmosis desalination process at a hydraulic pressure of about 0.9-2.1 MPa.

Also, MD and RO use less energy than conventional distillation processes, and the hydrostatic pressure required is less than that used in conventional pressure-driven processes respectively.

EXAMPLES

Example 1

By way of non-limiting example, rice straws can be extracted with ultrasound irradiation by the Sonic system (England, 50 MHz) having a horn at a power of 500 W. Sonication times of 0, 10, 20, 25, and 30 minutes in a specific ionic liquid at 90° C. were carried out and formed a mixture of rice straw lignocellulose and the ionic liquid. The mixture was continuously stirred at 90° C. for a total period of 1 h producing chalcone, isatin or benzoxazinone precursors. Then, a one pot reaction of the chalcone, isatin or benzoxazinone precursors with glycine, thiosemicarbazide or 2-aminouracil afforded the corresponding spiroheterocyclic products that react with various aromatic diisocyanates to produce the novel spiropolyurethane derivatives of the membrane. The progress of the reaction was monitored by thin-layer chromatography (TLC) using suitable organic solvents until the starting reactants disappeared as indicated by TLC using silica gel (60-120) mesh as an adsorbent and a UV lamp to achieve visualization. An automatic CHN analyzer was used for elemental analyses.

It is to be understood that the hydrophobic biofilm membrane modified with a spiropolyurethane is not limited to the specific embodiments or examples described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A hydrophobic biofilm membrane modified with a spiropolyurethane, wherein the membrane comprises a spongy porous texture and comprises lignocellulose biomass, and wherein the spiropolyurethane of the membrane produces a hydrophobic spin membrane boundary.

2. The membrane of claim 1, wherein the hydrophobic spin membrane boundary has a hinge-like motion.

3. The membrane of claim 1, wherein the membrane is capable of desalination of water.

4. The membrane of claim 3, wherein the desalination of water comprises a reverse osmosis (RO) or a membrane distillation (MD) process.

5. The membrane of claim 4, wherein the membrane is porous having pore sizes of about 0.25-0.47 nm and can be used in reverse osmosis (RO) at a hydraulic pressure of about 0.9-2.1 MPa.

6. A method of synthesizing the hydrophobic biofilm membrane as set forth in claim 1, comprising:
- extracting lignocellulose biopolymer from sources selected from the group consisting of lemon grass, olive tree, date pits, rice- and wheat-straws, and combinations thereof to produce a chalcone, isatin, and/or benzoxazinone precursor;
- conducting a one pot reaction of the chalcone, isatin, and/or benzoxazinone precursor with glycine, thiosemicarbazide, or 2-aminouracil to produce a corresponding spiroheterocyclic product; and
- reacting the spiroheterocyclic product with an aromatic diisocyanate to produce the hydrophobic biofilm membrane modified with a spiropolyurethane.

7. The method of claim 6, wherein the extracting is carried out via microwave or ultrasound-assisted extraction.

8. The method of claim 6, wherein the source is rice straws, which are first extracted with ultrasound irradiation by a sonic system at about 50 MHz and having a horn at a power of about 500 W.

9. The method of claim 8, wherein the ultrasound irradiation is conducted for up to about 30 minutes.

10. The method of claim 8, wherein the ultrasound irradiation is carried out in an ionic liquid at about 90° C., thereby forming a mixture comprising a rice straw lignocellulose biopolymer and the ionic liquid.

11. The method of claim 10, wherein the mixture is continuously stirred at about 90° C. for about 1 h.

12. The method of claim 6, wherein the hydrophobic biofilm membrane modified with a spiropolyurethane is prepared by an electrospinning impregnation method producing an electrospun nanofiber membrane (ENM), and wherein interfacial polymerization is used to produce a polyamide coating as an ultrathin top selective layer on the electrospun nanofiber membrane.

13. The method of claim 6, wherein the hydrophobic biofilm membrane modified with a spiropolyurethane is prepared by a solvothermal method.

14. A method of desalinating saline water to fresh water comprising employing the membrane of claim 1 in a reverse osmosis or membrane distillation desalination process, wherein the membrane is porous and wherein the spiropolyurethane of the membrane produces a hydrophobic spin membrane boundary which attracts the saline water.

15. The method claim 14, wherein the hydrophobic spin membrane boundary comprises a hinge-like motion for capture of salt molecules via a loose pore-gate spongy membrane surface texture.

16. The method of claim 15, wherein a flow rate of saline water contacting the membrane induces an electric charge on a surface of the membrane, and wherein said electric charge attracts most salts onto the surface of the membrane and allows for flow of desalinated water through the membrane.

17. The method of claim 16, wherein the desalination process is the reverse osmosis desalination process, the membrane has a pore size of about 0.25-0.47 nm, and the reverse osmosis ais carried out with a hydraulic pressure of about 0.9-2.1 MPa.

* * * * *